United States Patent
Wang et al.

(10) Patent No.: US 12,456,721 B2
(45) Date of Patent: Oct. 28, 2025

(54) PATTERNING OF ACTIVE MATERIAL LAYER OF ELECTRODE DURING CONTINUOUS EXTRUSION

(71) Applicant: GM GLOBAL TECHNOLOGY OPERATIONS LLC, Detroit, MI (US)

(72) Inventors: Chuanlong Wang, Troy, MI (US); Xiaowei Yu, Farmington Hills, MI (US); Ming Wang, Sterling Heights, MI (US); Xiaosong Huang, Novi, MI (US); Ryan Curtis Sekol, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 130 days.

(21) Appl. No.: 18/502,239

(22) Filed: Nov. 6, 2023

(65) Prior Publication Data

US 2025/0149536 A1 May 8, 2025

(51) Int. Cl.
*H01M 4/04* (2006.01)
*H01M 4/02* (2006.01)

(52) U.S. Cl.
CPC ....... *H01M 4/0435* (2013.01); *H01M 4/0411* (2013.01); *H01M 2004/028* (2013.01)

(58) Field of Classification Search
CPC ......... H01M 2004/028; H01M 4/0411; H01M 4/0435
See application file for complete search history.

(56) References Cited

U.S. PATENT DOCUMENTS

| | | | |
|---|---|---|---|
| 11,552,284 B2 | 1/2023 | Huemiller | |
| 11,688,843 B2 | 6/2023 | Huemiller et al. | |
| 2022/0069312 A1* | 3/2022 | Irish | H01M 4/0435 |
| 2022/0115636 A1* | 4/2022 | Johnson | H01M 10/052 |
| 2022/0328799 A1* | 10/2022 | Xia | H01M 4/1393 |
| 2023/0027323 A1 | 1/2023 | Xu et al. | |
| 2023/0170471 A1 | 6/2023 | Yao et al. | |

FOREIGN PATENT DOCUMENTS

| | | |
|---|---|---|
| DE | 102021109214 A1 | 3/2022 |
| DE | 102021130262 A1 | 5/2022 |
| KR | 102014099709 A | 8/2014 |

OTHER PUBLICATIONS

German Office Action from counterpart DE1020231368273, dated Aug. 7, 2024.

* cited by examiner

*Primary Examiner* — Vishal I Patel

(57) ABSTRACT

A method for manufacturing patterned electrodes includes extruding a mixture including an active material, a conductive additive, a binder, and a solvent from an extruder to form an active material layer; laminating the active material layer and a current collector; and patterning the active material layer using a patterned roller including a plurality of projections that form a plurality of features extending into the active material layer.

15 Claims, 7 Drawing Sheets

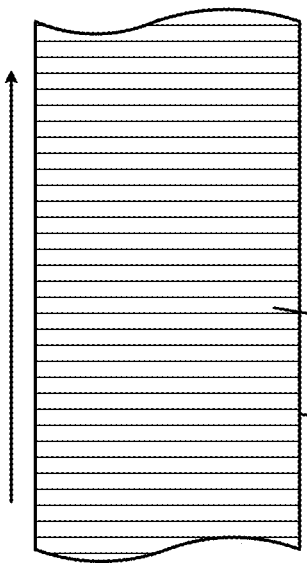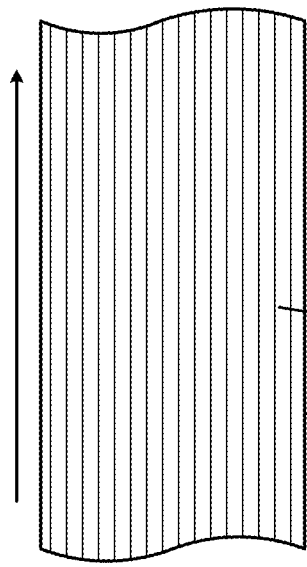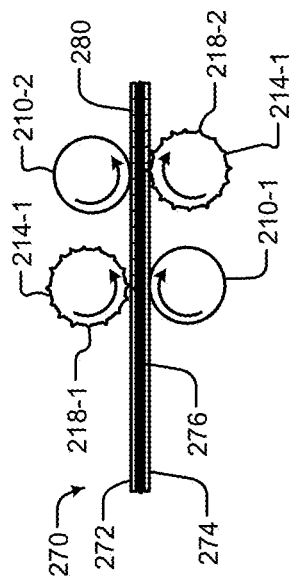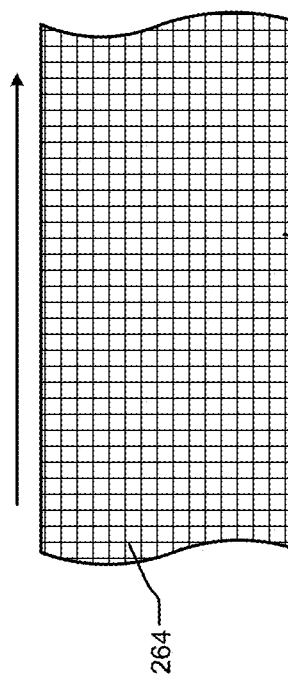

PATTERNING OF ACTIVE MATERIAL LAYER OF ELECTRODE DURING CONTINUOUS EXTRUSION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to a method for patterning active material layers of electrodes of battery cells during manufacturing.

Electric vehicles (EVs) such as battery electric vehicles (BEVs), hybrid vehicles, and/or fuel cell vehicles include one or more electric machines and a battery system including one or more battery cells, modules, and/or packs. A power control system is used to control charging and/or discharging of the battery system during charging and/or driving.

Battery cells include one or more cathode electrodes, anode electrodes, and separators. The cathode electrodes include a cathode active material layer (including cathode active material) arranged on a cathode current collector. The anode electrodes include an anode active material layer (including anode active material) arranged on an anode current collector.

SUMMARY

A method for manufacturing patterned electrodes includes a) extruding a mixture including an active material, a conductive additive, a binder, and a solvent from an extruder to form an active material layer; b) laminating the active material layer and a current collector; and c) patterning the active material layer using a patterned roller including a plurality of projections that form a plurality of features extending into the active material layer.

In other features, c) is performed before b). In other features, b) is performed before c). In other features, b) and c) comprise laminating the active material layer to the current collector using first and second rollers; and passing the active material layer and the current collector between the patterned roller and a third roller to pattern the active material layer.

In other features, b) and c) comprise patterning the active material layer using the patterned roller and a first roller; and laminating the active material layer after patterning to the current collector using third and fourth roller.

In other features, b) and c) comprise laminating the active material layer and the current collector and patterning the active material layer at the same time using the patterned roller and a first roller.

In other features, the plurality of features formed by the projections have a depth in a range from 10% to 90% of a thickness of the active material layer. The plurality of features formed by the projections have a depth in a range from 50% to 80% of a thickness of the active material layer. The plurality of projections create grooves extending at least one of a direction parallel to a rolling direction of the patterned roller and perpendicular to the rolling direction of the patterned roller. The plurality of projections create discrete features that are spaced uniformly on the active material layer.

A method for manufacturing patterned electrodes includes a) extruding a mixture including a cathode active material that exchanges lithium ions, a conductive additive, a binder, and a solvent from an extruder to form a cathode active material layer; b) laminating the cathode active material layer and a cathode current collector; and c) patterning the cathode active material layer using a patterned roller including a plurality of projections that form a plurality of features extending into the cathode active material layer. The plurality of features formed by the plurality of projections have a depth in a range from 10% to 90% of a thickness of the cathode active material layer.

In other features, c) is performed before b). In other features, b) is performed before c). In other features, b) and c) comprise laminating the active material layer to the current collector using first and second rollers; and passing the active material layer and the current collector between the patterned roller and a third roller to pattern the active material layer.

In other features, b) and c) comprise patterning the active material layer using the patterned roller and a first roller; and laminating the active material layer after patterning to the current collector using third and fourth roller.

In other features, b) and c) comprise laminating the active material layer and the current collector and patterning the active material layer at the same time using the patterned roller and a first roller.

In other features, the features formed by the plurality of projections have a depth in a range from 50% to 80% of a thickness of the cathode active material layer. The plurality of projections create grooves extending at least one of a direction parallel to a rolling direction of the patterned roller and perpendicular to the rolling direction of the patterned roller. The plurality of projections create discrete features that are spaced uniformly on the cathode active material layer.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 6A to 7C are plan views illustrating examples of patterns formed on the active material layer of the electrodes according to the present disclosure;

FIG. 8 is a side cross sectional view illustrating an example of dual-sided patterning of active material layers of an electrode according to the present disclosure.

In the drawings, reference numbers may be reused to identify similar and/or identical elements.

DETAILED DESCRIPTION

While battery cells according to the present disclosure are shown in the context of electric vehicles, the battery cells can be used in stationary applications and/or other applications.

The present disclosure relates to patterning of active material layers of electrodes of battery cells during manufacturing of the electrode to improve the electrochemical performance of thicker electrodes (for high energy batteries). An extruder continuously extrudes electrode paste into a freestanding film corresponding to the active material layer. A patterned roller includes a plurality of projections configured to be pressed into the active material layer to form a pattern of cavities or features in the active material layer. The patterning can be performed before or after the active material layer is laminated to a current collector and before an electrode drying process.

Patterned electrodes described herein enable high-energy, thick electrodes (thickness >120 μm for single-sided coating) with improved rate performance. The patterns formed in the active material layers increase surface area for electrolyte/electrode contact and enhance kinetics for thick electrodes. The patterns are applied to the surface of a doughy, deformable electrode coating after extrusion to minimize abrasion of the patterned rollers.

In some examples, electrode materials (e.g., active material, conductive additive, binder and/or solvent) are combined in an extruder chamber and extruded into a freestanding film. A patterning roller (e.g., a cylindrical substrate such as stainless steel and a non-stick coating such as polytetrafluoroethylene (PTFE)-coated or urethane) generates predetermined patterns of features on a surface of the extruded wet electrode (e.g., with solid content >80%). The patterned electrode is laminated on a current collector using a non-stick roller to achieve the desired electrode coating/current collector adhesion. Lamination can be done before, during or after the patterning. After patterning and lamination, the electrodes are dried in an oven and calendared to a predetermined thickness/porosity.

Figure 1:
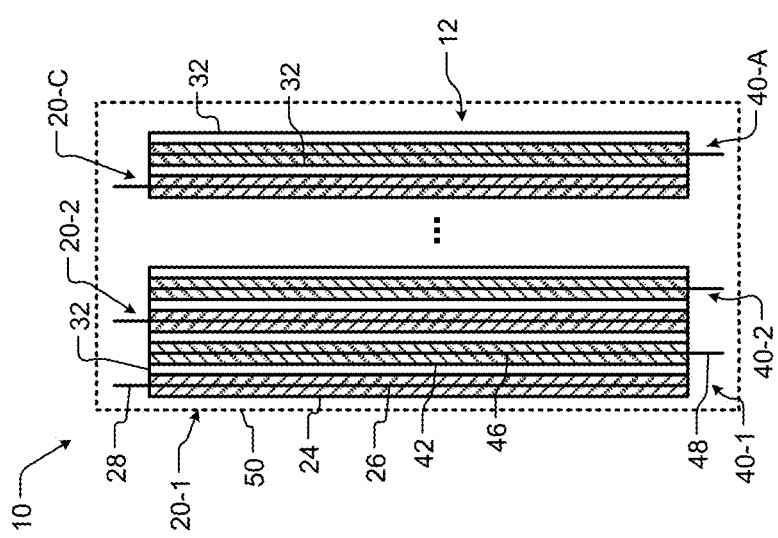
FIG. 1 is a side cross sectional view of an example of a battery cell including anode electrodes, cathode electrodes, and separators according to the present disclosure.

Referring now to FIG. 1, a battery cell 10 includes C cathode electrodes 20, A anode electrodes 40, and S separators 32 arranged in a predetermined sequence in a battery cell stack 12, where C, S and A are integers greater than zero. The C cathode electrodes 20-1, 20-2, ..., and 20-C include cathode active material layers 24 arranged on one or both sides of a cathode current collector 26.

During charging/discharging, the A anode electrodes 40 and the C cathode electrodes 20 exchange lithium ions. The A anode electrodes 40-1, 40-2, ..., and 40-A include anode active material layers 42 arranged on one or both sides of the anode current collectors 46. In some examples, the cathode active material layers 24 and/or the anode active material layers 42 comprise coatings or extrusions including one or more active materials, one or more conductive additives, and/or one or more binder materials that are applied to the current collectors (e.g., using a wet or dry roll-to-roll process).

In some examples, the cathode current collector 26 and/or the anode current collector 46 comprises metal foil, metal mesh, perforated metal, 3 dimensional (3D) metal foam, and/or expanded metal. In some examples, the current collectors are made of one or more materials selected from a group consisting of copper, stainless steel, brass, bronze, zinc, aluminum, and/or alloys thereof. External tabs 28 and 48 are connected to the current collectors of the cathode electrodes and anode electrodes, respectively, and can be arranged on the same or different sides of the battery cell stack 12. The external tabs 28 and 48 are connected to terminals of the battery cells. In some examples, the C cathode electrodes 20 and/or the A anode electrodes 40 include active material layers that are extruded and patterned as described herein.

Figure 2:
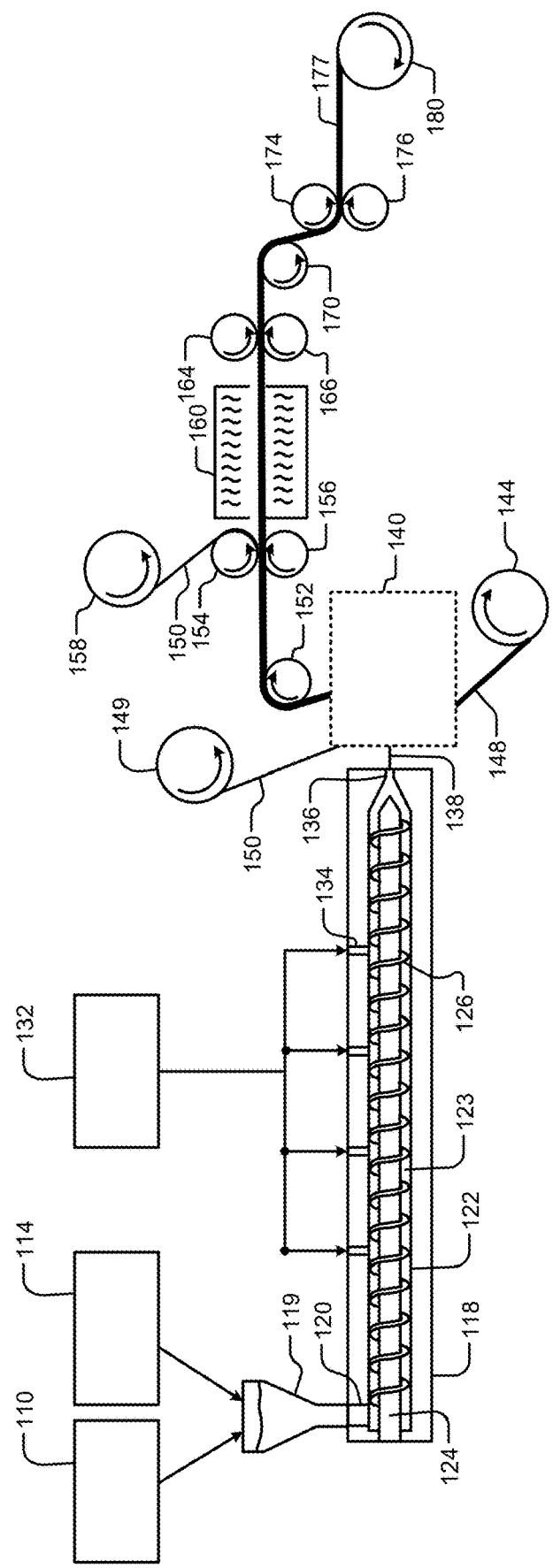
FIG. 2 is a functional block diagram illustrating an example of patterning of active material layers during manufacturing electrodes according to the present disclosure.

Referring now to FIG. 2, manufacturing of patterned electrodes is shown. Active material 110 and/or conductive additive 114 are supplied to an inlet 120 of an extruder 118 (via an optional funnel 119). The extruder 118 includes an elongated cavity 122. A screw 123 including a shaft 124 with an inclined plane 126 is located in the elongated cavity 122 and is configured to rotate. The screw 123 moves/mixes the mixture through the elongated cavity 122 to extrude the mixture for active material layers of anode electrodes and/or cathode electrodes. One or more inlets 134 are arranged along the extruder 118 to allow binder and/or solvent to be added at one or more lateral locations into the elongated cavity 122.

Figure 3:
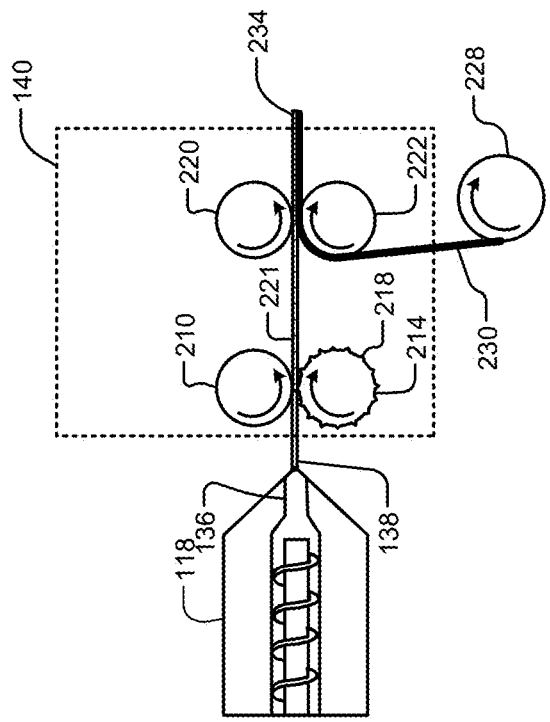
FIGS. 3 to 5 are side cross sectional views illustrating an example of patterning of an active material layer of an electrode according to the present disclosure.
Figure 5:
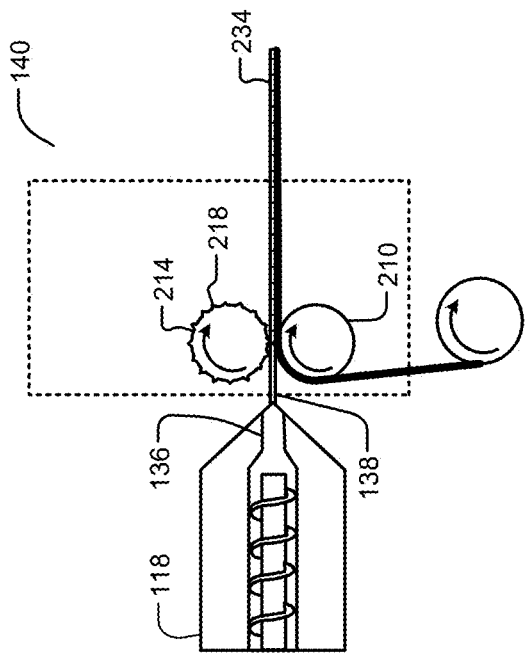
Figure 4:
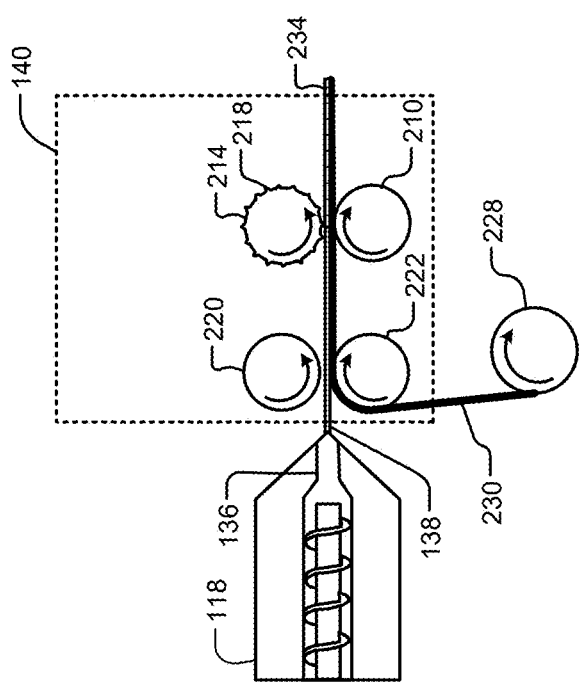

An extruded active material layer 138 corresponding to an active material layer is output at an outlet 136 of the extruder 118 and fed to an electrode patterning and lamination portion 140 (examples shown and described in FIGS. 3 to 5). A roll 144 supplies a layer such as a current collector 148 to the electrode patterning and lamination portion 140. In some examples, a roll 149 supplies an optional release layer 150 to the electrode patterning and lamination portion 140.

The current collector 148, the extruded active material layer 138 (after patterning), and the optional release layer 150 may optionally pass over one or more guide rollers 152 before being fed between rollers 154 and 156. The optional release layer 150 may be removed and collected on a roll 158.

The current collector 148 and the extruded active material layer 138 pass through an oven operating at a temperature in a predetermined range to dry the extruded mixture. The current collector 148 and the extruded active material layer 138 are dried in the oven and then guided between rollers 164 and 166, over an optional guide roller 170, and pressed and/or heated by rollers 174 and 176 to a predetermined thickness and/or porosity. After passing through the rollers 174 and 176, a patterned electrode 177 including the current collector 148 and the extruded active material layer 138 (e.g., the electrode) is collected on a roll 180.

As will be described further below, manufacturing of the electrodes includes patterning of the active material layer in the electrode patterning and lamination portion 140 prior to drying in the oven 160 as will be described further below in FIGS. 3, 4, 5, and 8. While a single-sided electrode is shown in FIG. 2, dual-sided electrodes can be manufactured as will be described below.

Referring now to FIGS. 3 to 5, examples of the electrode patterning and lamination portion 140 are shown. In FIG. 3, the extruder 118 outputs the extruded active material layer 138 between a roller 210 and a patterning roller 214 including projections 218 extending therefrom. Then, a patterned active material layer 221 is fed between rollers 220 and 222. A roll 228 supplies a current collector 230 between the rollers 220 and 222. The rollers 220 and 222 press and/or heat the current collector 230 and the patterned active material layer to laminate the layers and form a patterned electrode 234.

In FIG. 4, the extruder 118 outputs the extruded active material layer 138 between the rollers 220 and 222. The roll 228 supplies the current collector 230 between the rollers 220 and 222. The extruded active material layer 138 and the current collector 230 are pressed and/or heated by the rollers 220 and 222 to laminate the layers. Then, the extruded active material layer 138 and the current collector 230 are fed between the roller 210 and the patterning roller 214 including the projections 218 to pattern an active material layer (corresponding to the extruded active material layer 138) and to form the patterned electrode 234.

In FIG. 5, the extruder 118 outputs the extruded active material layer 138 between the roller 210 and the patterning roller 214 including projections 218 extending therefrom. The roll 228 supplies the current collector 230 between the roller 210 and the patterning roller 214 to form the patterned electrode 234.

Figure 6A:
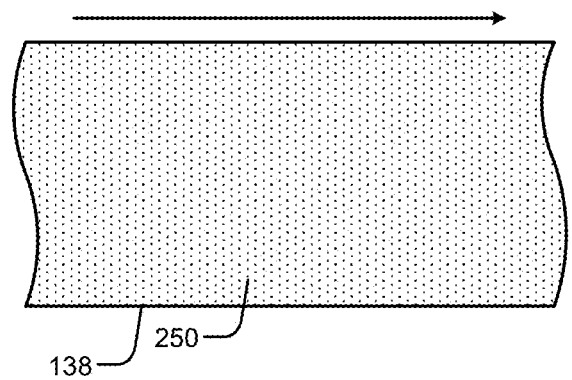

Referring now to FIGS. 6A and 7C, examples of patterns can be formed on the active material layer of the electrodes. For example only, the pattern in the extruded active material layer 138 (e.g., the active material layer) may include microfeatures 250 that are uniformly spaced on a surface of an active material layer opposite to a surface abutting the current collector.

In some examples, the patterning roller 214 includes projections 218 extending a predetermined distance d from a circumferential surface 219 of the patterning roller. In some examples, the projections 218 include individual projections (e.g., see FIGS. 6A to 6C described below). In some examples, the projections 218 extend from one side of the roller to the other in axial and/or circumferential directions (e.g., see FIGS. 7A to 7C described further below) to provide continuous grooves from one side of the electrode to the other side of the electrode.

Depending on a gap between the patterning roller and an adjacent, non-patterned roller, the extruded active material layer 138 and the current collector 148 may be pressed by the circumferential surface 219 and the projections. In other examples, only the projections 218 are pressed into the active material layer. The projections 218 can have any suitable shape. Examples include V-shaped, cone-shaped, cube-shaped, cylindrical-shaped, spherical-shaped, and/or other shapes.

Figure 6B:
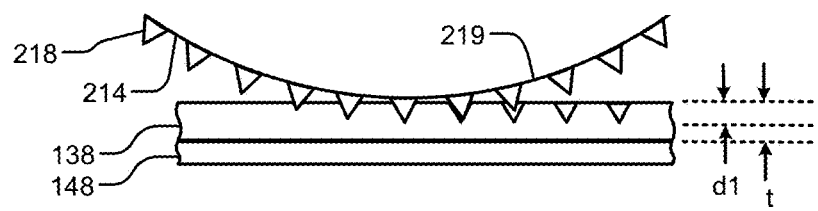

In FIG. 6B, the circumferential surface 219 of the patterning roller 214 is spaced from the extruded active material layer 138 such that the active material layer is not pressed. The projections 218 are pressed into the extruded active material layer 138 by a distance d1. In other words, a thickness of the extruded active material layer 138 between the features is equal to t before and after patterning. In some examples, d1 is in a range of 20% to 80% of t. In some examples, d1 is in a range of 50% to 80% of t.

Figure 6C:
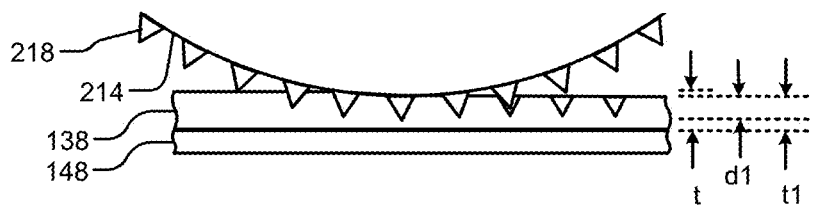

In FIG. 6C, the circumferential surface 219 of the patterning roller 214 presses the extruded active material layer 138 from the thickness t to a thickness t1 (<thickness t). In addition, the projections 218 are pressed into the active material layer by a distance d1. A thickness of the active material layer is equal to t1 after patterning. In some examples, d1 is in a range of 10% to 90% of t1. In some examples, d1 is in a range of 50% to 80% of t1.

For example, the pattern in the extruded active material layer 138 (e.g., the active material layer) may include one or more sets of grooves 260 or 264 as shown in FIG. 7A to 7C. The grooves 260 or 264 can extend parallel to one another (and parallel to a rolling direction of the roller or perpendicular to a rolling direction of the roller) and in a non-overlapping pattern as shown in FIGS. 7A and 7B or in an overlapping manner in FIG. 7C.

Referring now to FIG. 8, dual-sided patterning of active material layers arranged on a current collector of an electrode can be performed. An electrode 270 includes an active material layers 272 and 274 arranged on opposite sides of a current collector 276. The electrode 270 is fed between a roller 210-1 and a patterning roller 214-1 including projections 218-1 extending therefrom to pattern the active material layer 272. The electrode 270 is fed between a roller 210-2 and a patterning roller 214-2 including projections 218-2 extending therefrom to pattern the active material layer 274 to form a patterned electrode 280.

Figure 9:
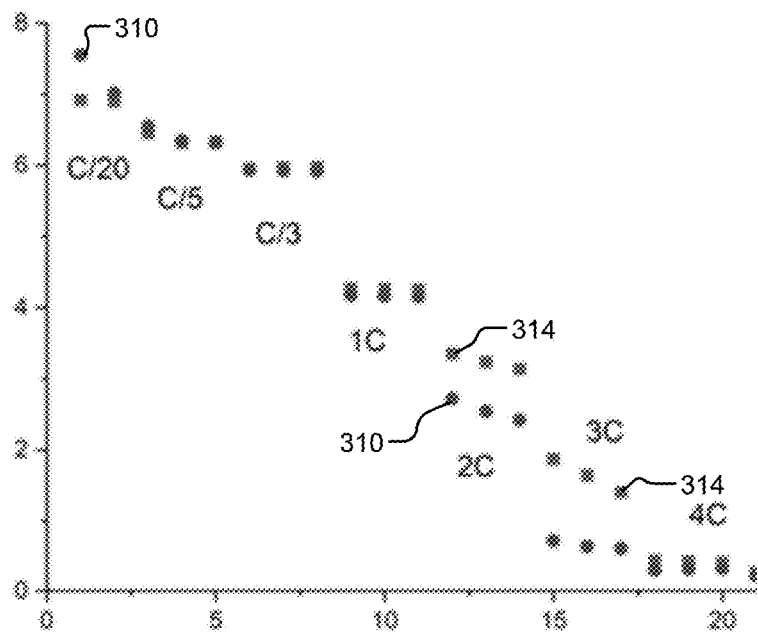
FIGS. 9 and 10 illustrate an example of capacity as a function of cycles for patterned electrodes according to the present disclosure and un-patterned electrodes during charging and discharging, respectively.
Figure 10:
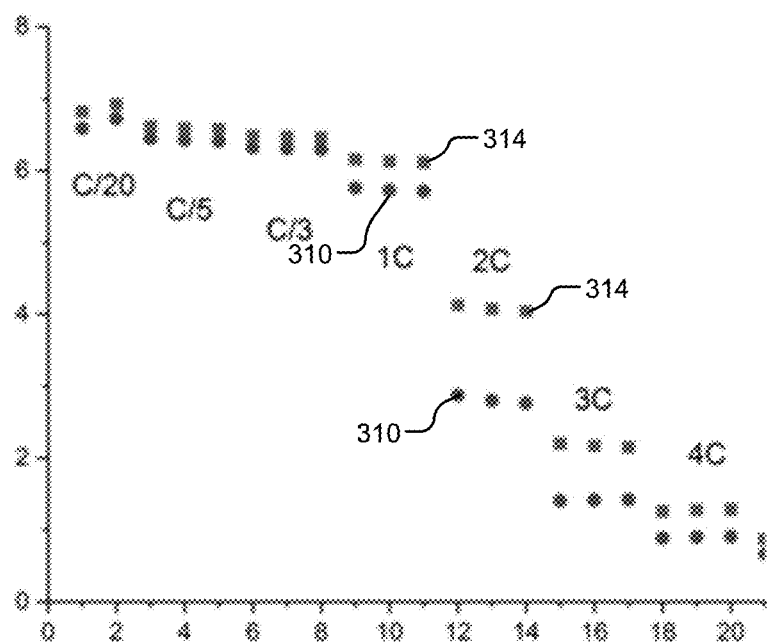

Referring now to FIGS. 9 and 10, capacity is illustrated as a function of cycles for patterned electrodes according to the present disclosure and un-patterned electrodes during charging and discharging, respectively. In the examples shown in FIGS. 9 and 10, the anode active material layer comprises 5.5% $SiO_x$. The cathode electrode comprises cathode active material including nickel cobalt manganese aluminum (NCMA) blended with lithium manganese iron phosphate (LMFP). Both patterned and non-patterned cathode electrodes are calendared to porosities of 30 to 35%. The electrolyte comprises 1M $LiPF_6$ in a mixture of ethylene carbonate and dimethyl carbonate (EC:DMC) (at a ratio of 3:7)+1% lithium difluoro (oxalato) borate (LiDFOB). As can be seen, the performance of the patterned electrodes is higher than a control electrode that is not patterned during charging and discharging.

Figure 11A:
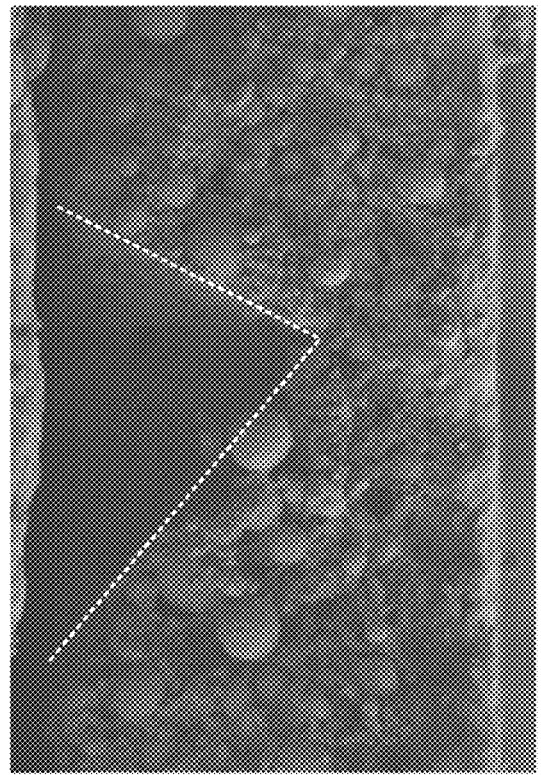
FIGS. 11A and 11B are examples of scanning electron microscope images showing cross-sectional morphology of a feature before and after calendaring according to the present disclosure.
Figure 11B:
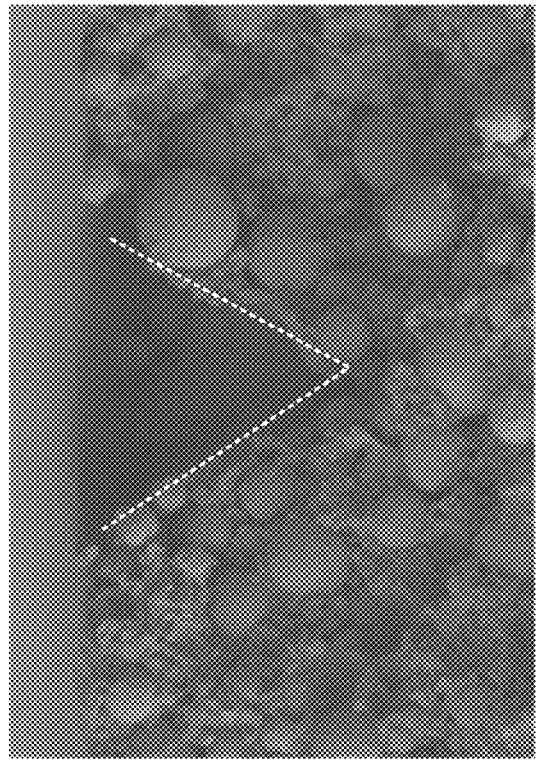

Referring now to FIGS. 11A to 11B, cross-sectional morphology of one of the features is shown before and after calendaring.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A method for manufacturing patterned electrodes, comprising:
   a) extruding a mixture including an active material, a conductive additive, a binder, and a solvent from an extruder to form an active material layer;
   b) laminating the active material layer and a current collector; and
   c) patterning the active material layer using a patterned roller including a plurality of projections that form a plurality of features extending into the active material layer,
   wherein c) is performed before b).

2. The method of claim 1, wherein b) and c) comprise:
   laminating the active material layer to the current collector using first and second rollers; and
   passing the active material layer and the current collector between the patterned roller and a third roller to pattern the active material layer.

3. The method of claim 1, wherein b) and c) comprise:
   patterning the active material layer using the patterned roller and a first roller; and
   laminating the active material layer after patterning to the current collector using third and fourth roller.

4. The method of claim 1, wherein b) and c) comprise laminating the active material layer and the current collector and patterning the active material layer at the same time using the patterned roller and a first roller.

5. The method of claim 1, wherein the plurality of features formed by the projections have a depth in a range from 10% to 90% of a thickness of the active material layer.

6. The method of claim 1, wherein the plurality of features formed by the projections have a depth in a range from 50% to 80% of a thickness of the active material layer.

7. The method of claim 1, wherein the plurality of projections create grooves extending at least one of a direction parallel to a rolling direction of the patterned roller and perpendicular to the rolling direction of the patterned roller.

8. The method of claim 1, wherein the plurality of projections create discrete features that are spaced uniformly on the active material layer.

9. The method of claim 1, wherein the patterned roller includes a non-stick coating on a substrate.

10. A method for manufacturing patterned electrodes, comprising:
    a) extruding a mixture including a cathode active material that exchanges lithium ions, a conductive additive, a binder, and a solvent from an extruder to form a cathode active material layer;
    b) laminating the cathode active material layer and a cathode current collector; and
    c) patterning the cathode active material layer using a patterned roller including a plurality of projections that form a plurality of features extending into the cathode active material layer,
    wherein the plurality of features formed by the plurality of projections have a depth in a range from 10% to 90% of a thickness of the cathode active material layer,
    wherein b) and c) comprise:
       patterning the cathode active material layer using the patterned roller and a first roller; and
       laminating the cathode active material layer after patterning the cathode current collector using a third and a fourth roller.

11. The method of claim 10, wherein c) is performed before b).

12. The method of claim 10, wherein b) is performed before c).

13. The method of claim 10, wherein the features formed by the plurality of projections have a depth in a range from 50% to 80% of a thickness of the cathode active material layer.

14. The method of claim 10, wherein the plurality of projections create grooves extending at least one of a direction parallel to a rolling direction of the patterned roller and perpendicular to the rolling direction of the patterned roller.

15. The method of claim 10, wherein the plurality of projections create discrete features that are spaced uniformly on the cathode active material layer.

* * * * *